United States Patent [19]
Kitzner et al.

[11] 3,770,389
[45] Oct. 30, 1973

[54] CATALYTIC CONVERTER WITH ELECTRICALLY RESISTIVE CATALYST SUPPORT

[75] Inventors: Ernest W. Kitzner, Allen Park; Alex Rhodes, Orchard Lake; Moses Shachter, Oak Park, all of Mich.

[73] Assignee: Ford Motor Company, Dearborn, Mich.

[22] Filed: Nov. 11, 1971

[21] Appl. No.: 197,768

[52] U.S. Cl. .............. 23/288 F, 23/288 J, 423/213, 60/300, 252/477 R, 219/374
[51] Int. Cl. .............................................. B01j 9/04
[58] Field of Search .................... 23/288 F, 288 J; 423/213; 60/300; 252/477

[56] References Cited
UNITED STATES PATENTS
1,789,812   1/1931   Frazer ........................... 23/288 F X
2,865,721  12/1958   Lane et al. ....................... 23/288 F
3,479,143  11/1969   Kelsall ............................ 23/288 J

*Primary Examiner*—James H. Tayman, Jr.
*Attorney*—Keith L. Zerschling et al.

[57] ABSTRACT

A corrugated stainless steel sheet and a flat stainless steel sheet are sandwiched together and wound spirally so the corrugations form a plurality of small gas flow passages connecting the converter inlet with the converter outlet. Alumina coatings on the sheets electrically insulate the sheets from each other and a finely divided catalyst is distributed on the alumina coatings. Electrical energy flows through the sheets to heat the catalyst to operating temperature.

2 Claims, 5 Drawing Figures

CATALYTIC CONVERTER WITH ELECTRICALLY RESISTIVE CATALYST SUPPORT

BACKGROUND OF THE INVENTION

This invention relates to that described in U.S. patent application Kitzner et al. Ser. No. 155,550, filed June 22, 1971 and entitled "Catalytic Converter with Electrically Preheated Catalyst."

The catalyst of most catalytic converters for treating the exhaust gases of reciprocating internal combustion engines usually must attain some predetermined temperature before beginning effective catalytic conversion. A reciprocating engine requires an enriched fuel-air mixture during starting and initial operation and the exhaust gases produced during these periods contain relatively high quantities of unburned hydrocarbons and carbon monoxide. Releasing these unburned hydrocarbons and carbon monoxide to the atmosphere increases significantly the total quantity of undesirable components produced by the engine.

An electrical heater is included in the catalyst support structure of the invention described in the aforementioned Kitzner et al. patent application and electrical energy is supplied to the heater during initial operation to bring the catalyst to its operating temperature within a short time after the engine is started. The heater is a resistance type coil heater that is located in heat conductive contact with the catalyst.

SUMMARY OF THE INVENTION

This invention provides a catalytic converter construction that utilizes the catalyst support structure to heat at least a portion of the catalyst up to operating temperature rapidly and efficiently. Heat from the exothermic reaction produced by that portion assists in bringing the remainder of the catalyst in the converter up to operating temperature. The catalytic converter comprises an outer housing having an inlet for admitting the exhaust gases to the housing and an outlet for removing the exhaust gases from the housing. A catalyst support structure is located within the housing between the inlet and the outlet. The support structure includes an electrically resistive member having a large surface area disposed in the exhaust gas flow path between the inlet and the outlet. A catalyst is distributed on the large surface area of the support structure where the catalyst contacts the exhaust gases. An electrical energy source is connected to the electrically resistive member and supplies electrical energy until the catalyst reaches some predetermined temperature.

The electrically resistive member preferably comprises a corrugated metal sheet wound in a spiral so its corrugations form a plurality of small flow passages connecting the housing inlet with the housing outlet. A flat metal sheet can be sandwiched with the corrugated metal sheet if desired. The sheets are coated with an electrically insulating material and the inner edges thereof are connected to an electrically conductive rod that forms the core of the spiral construction. An electrically conductive tube surrounds and is connected electrically to the outer edges of the metal sheets. The rod and the tube thus form inner and outer terminals for the sheets. Finely divided catalyst is applied to the coatings on the sheets so that the exhaust gases flowing through the small passages contact the catalyst.

A conventional catalyst bed can be located radially outward or downstream of the spiral construction. The conventional catalyst bed typically comprises a monolithic ceramic honeycomb having finely divided catalyst dispersed along its passages. Heat produced by the exothermic catalytic reaction in the spiral structure transfers to the catalyst in the conventional catalyst bed and thereby rapidly brings the entire catalyst charge into operation.

DETAILED DESCRIPTION

Figure 1:
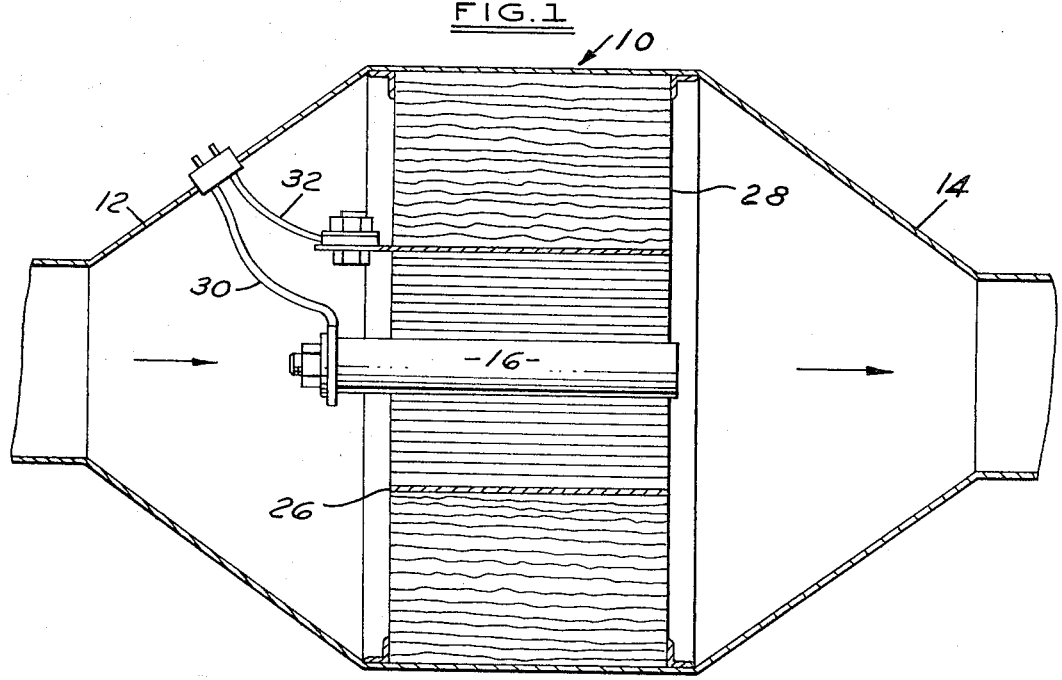
FIG. 1 is a sectioned side view of a catalytic converter of this invention having the spiral support structure located radially inward of a conventional catalytic bed.
Figure 3:
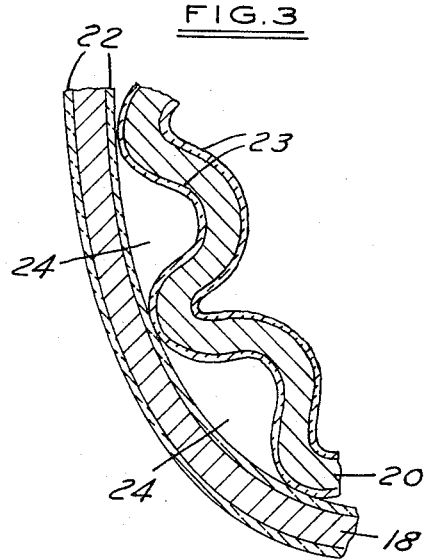
FIG. 3 is an enlargement of a portion of the spiral structure showing the relationship of the coated sheets of flat and corrugated metal.
Figure 2:
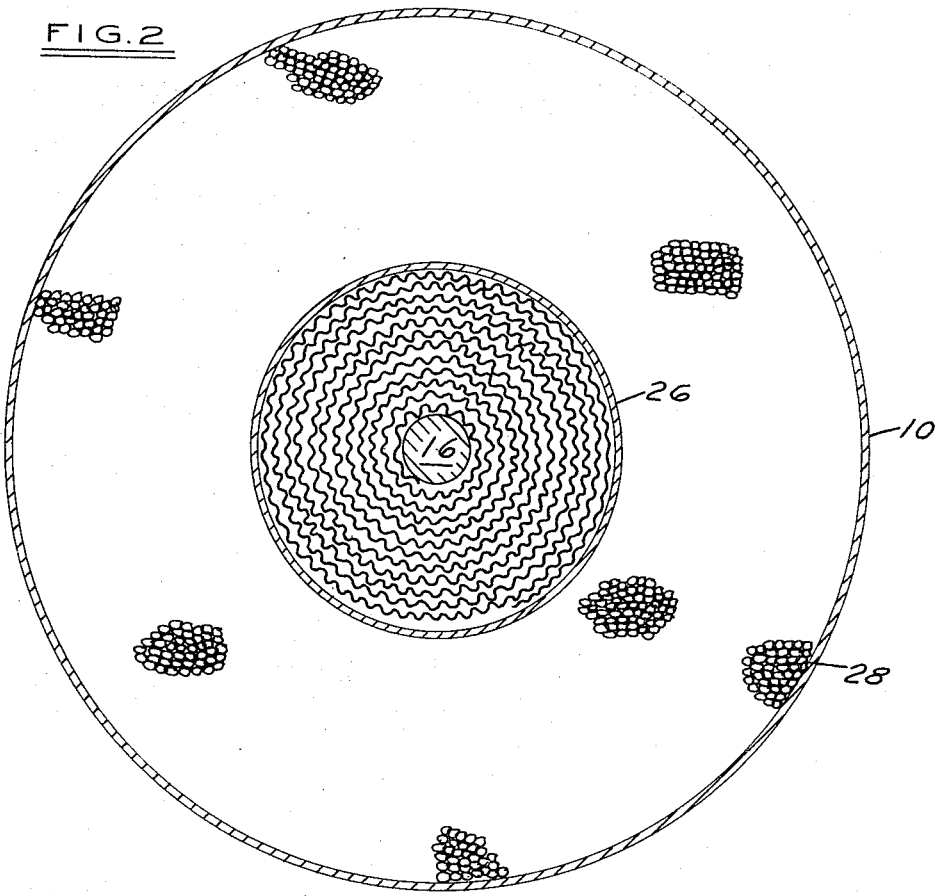
FIG. 2 is a sectioned end view of the catalyst structure of FIG. 1.

Referring to FIGS. 1-3, a catalytic converter of this invention comprises a housing 10 having a cone-shaped inlet 12 and a cone-shaped outlet 14. Inlet 12 is connected to the engine exhaust manifold and outlet 14 communicates with the atmosphere through an exhaust pipe.

An electrically conductive metal rod 16 is located coaxially within converter housing 10. Rod 16 is connected to the inner edges of a flat stainless steel sheet 18 that is sandwiched with a corrugated stainless steel sheet 20. Both sides of the sheets 18 and 20 are coated with a thin coating 22 and 23 respectively of an electrically insulating ceramic material such as gamma alumina. The sandwich of coated sheet 18 and coated sheet 20 is wound spirally about rod 16 so that the corrugations form a plurality of small gas flow passages 24 that connect inlet 12 with outlet 14. An electrically conductive tube 26 surrounds the spiral sandwich of sheets 18 and 20 and the outer edges of sheets 18 and 20 are connected electrically to tube 26.

A toroidal catalyst bed 28 fills the space between tube 26 and the interior of housing 10. Catalyst bed 28 typically is a monolithic ceramic material such as cordierite or spodomene coated with gamma alumina and having a plurality of gas flow passages extending therethrough to connect inlet 12 with outlet 14. Finely divided catalyst particles are dispersed uniformly along the surface area of coatings 22 and 23 and the passages in catalyst bed 28.

Figure 4:
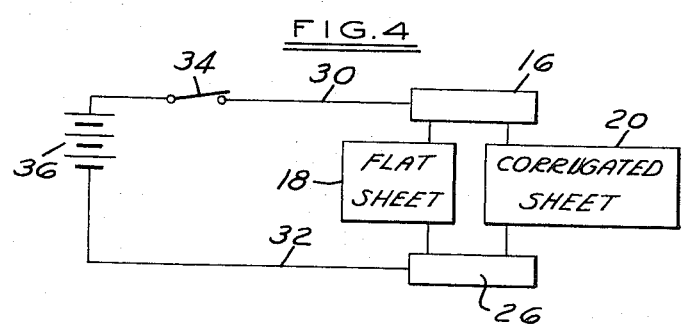
FIG. 4 is an electrical schematic showing the parallel connections to a battery of the flat sheet and the corrugated sheet making up the spiral structure.
Figure 5:
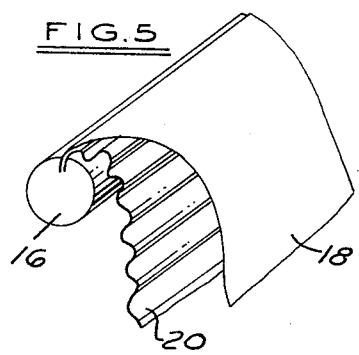
FIG. 5 is a partial perspective showing the technique of assembling a sandwich of a corrugated sheet and a flat sheet to the central rod.

An electrical lead 30 is connected to rod 16 and a second electrical lead 32 is connected to tube 26. As shown in FIG. 4, lead 30 is connected through a switch 34 to the positive terminal of a battery 36 and lead 32 is connected to the negative terminal of battery 36. Flat sheet 18 and corrugated sheet 20 thus are electrically in parallel with each other.

Starting the engine closes switch 34 and thereby connects battery 36 across flat sheet 18 and corrugated sheet 20. The electrical resistance of sheets 18 and 20 converts the electrical energy into heat that is transferred conductively through coatings 22 and 23 to the finely divided particles of catalyst dispersed on the surfaces of the coatings. The temperature of the catalyst particles increases rapidly to operating temperature where the catalyst begins catalytic activity. Heat from the exothermic catalytic reaction transfers radially outward through tube 26 to the catalyst in catalyst bed 28. This heat is supplemented by heat obtained from the exhaust gases flowing through the passages in catalyst bed 28 to bring the catalyst in bed 28 to operating temperature. When a substantial portion of the catalyst in the converter has reached operating temperature, a temperature control mechanism (not shown) opens switch 34 to disconnect battery 36 from sheets 18 and 20.

Numerous other materials having suitable electrical resistivity can be substituted for the stainless steel used to makes sheets 19 and 20. Typical materials which also have suitable high temperature properties include chromium-iron alloys, nickel-iron alloys, nickel-chromium alloys, etc. Gamma alumina is highly desirable as the coatings 22 and 23 for sheets 18 and 20 because it has excellent electrical insulating properties and it also produces an irregular surface having an increased surface area. Other useful materials suitable as coatings 22 and 23 include chromium oxide and various other metal oxides and ceramics.

Thus this invention provides a catalytic converter that rapidly and efficiently converts electrical energy into elevated catalyst temperatures and thereby improves overall catalytic activity. Using the electrically resistive means as a support for the catalyst reduces converter construction costs and increases heat transfer from the electrical resistance means to the catalyst.

We claim:

1. A catalytic converter for treating a gas stream comprising:
    an outer housing including an inlet for admitting the gas stream, an outlet for removing the gas stream from said housing and a central portion between said inlet and said outlet for supporting a catalyst treatment system;
    a first catalyst bed forming a portion of said catalyst treatment system and comprising a catalyst support material with a finely divided catalyst dispersed thereon, said first catalyst bed being positioned within said central portion of said outer housing and extending inwardly from an enclosing wall of said central portion of said housing toward a central axis of said central portion of said housing, said first catalyst bed terminating at an inner surface thereby to form an open volume through said first catalyst bed generally centered about said central axis of said central portion of said housing,
    a second catalyst bed forming a portion of said catalyst treatment system and located within said open volume of said first catalyst bed, said second catalyst bed comprising a corrugated, electrically resistive metal sheet and a flat, electrically resistive metal sheet, said corrugated sheet and said flat sheet having a thin coating of an electrical insulating material thereon providing an irregular, rough surface on said sheets, a catalyst dispersed on said rough surface area of said thin coating on said sheets, said corrugated sheet and said flat sheet having first ends electrically connected to a centrally disposed electrode, said flat sheet and said corrugated sheet from said first ends being wrapped about said centrally disposed electrode to form passageways between said corrugated sheet and said flat sheet generally aligned with the direction of flow of gas stream from said inlet to said outlet of said housing, said corrugated sheet and said flat sheet having second ends terminating adjacent said inner surface of said first catalyst bed, which second ends are electrically connected to an annular electrode position at said inner surface of said first catalyst bed, and
    electric circuit means for connecting an external electric power source to both central electrode and said annular electrode thereby to connect said resistance metal of said flat sheet and said corrugated sheet to an electric power source whereby when the electric power source is energized, the dissipation of electric energy in said resistance of said corrugated sheet and said flat sheet will initially preheat said second catalyst bed and, in turn, said first catalyst bed to a temperature sufficient to promote the catalyst activity of the catalyst treatment system.

2. The catalytic converter as defined in claim 1 in which the corrugated metal sheet and the flat metal sheet are formed of stainless steel and the thin coating of electrical insulating material on said sheets is formed of aluminum.

* * * * *